United States Patent Office.

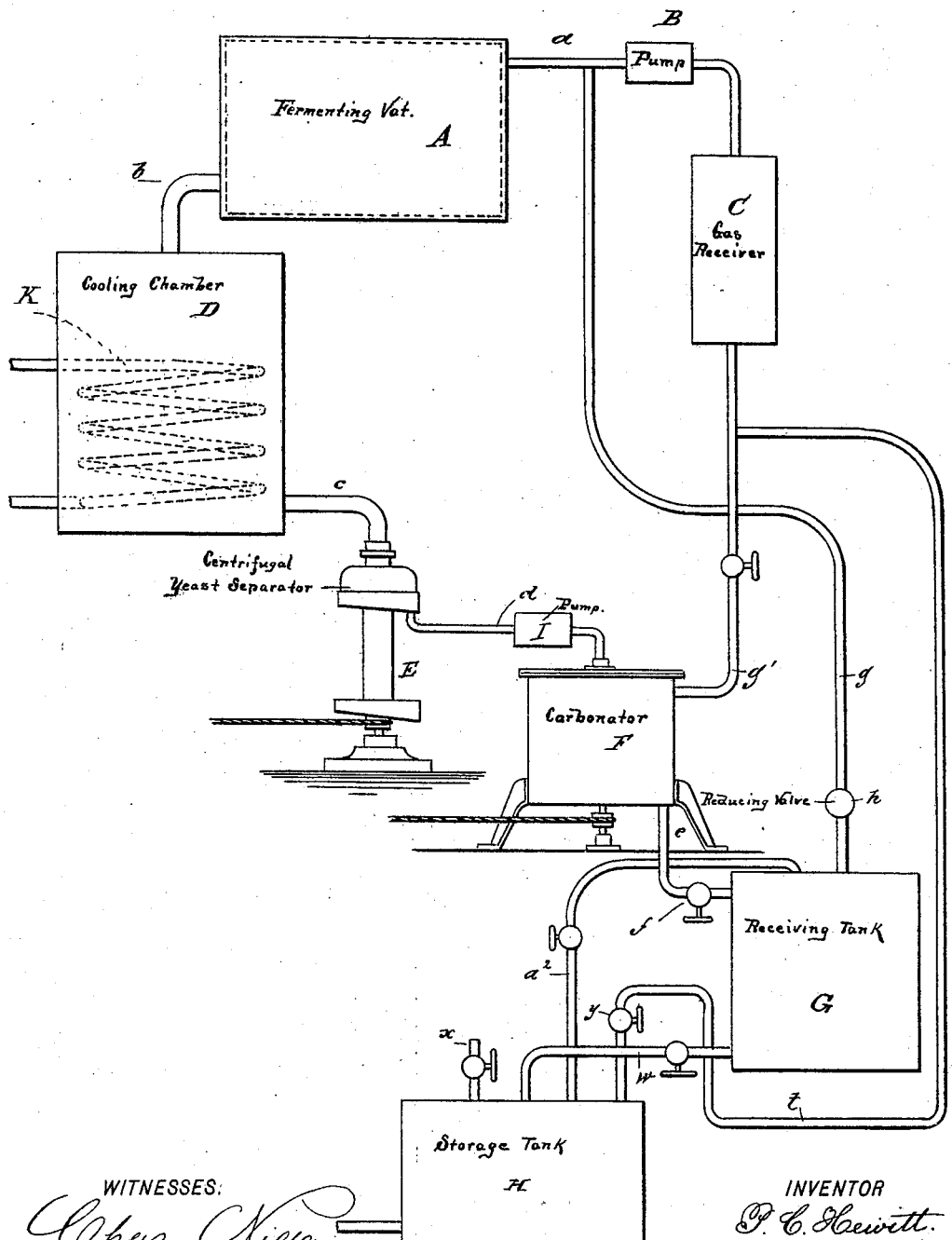

PETER COOPER HEWITT, OF NEW YORK, N. Y.

APPARATUS FOR MANUFACTURING BEER.

SPECIFICATION forming part of Letters Patent No. 581,207, dated April 20, 1897.

Application filed March 6, 1895. Serial No. 540,740. (No model.)

*To all whom it may concern:*

Be it known that I, PETER COOPER HEWITT, of New York city, in the county and State of New York, have invented a new and Improved Apparatus for the Manufacture of Beer, of which the following is a full, clear, and exact description.

My invention relates to improvements in apparatus for the manufacture of beer.

My present invention has for its object to provide an improved apparatus for brewing beer, said apparatus being constructed substantially as hereinafter described and claimed.

My invention will be understood by reference to the accompanying drawing, which shows a diagram of an apparatus for carrying out my invention.

In carrying out my invention I ferment the wort in any desired manner in the usual fermenting-vat A. This wort, as is well known, gives off carbonic-acid gas generated by the fermentation, which gas I remove from the vat A by means of a pipe $a$ or other suitable means, with which may be connected a suitable pump B. Carbonic-acid gas is forced by the pump into a receiver C and there stored under pressure. The beer is conducted by suitable means, such as a pipe $b$, into a cooling-chamber D, (when it is not cooled to the required temperature,) which is cooled by a refrigerating-coil K or by analogous means. This cooling is done preparatory to separating the yeast and other impurities from the beer. I have discovered that the impurities may be more perfectly separated from the beer at a temperature near the freezing-point, that is below 32° Fahrenheit. When the beer has been properly cooled, it is conducted by a pipe $c$ into a separator or purifier E. This separator or purifier may be of any suitable construction. In this separator or purifier the yeast and other impurities are thrown out by centrifugal force, leaving the beer freed from yeast. This purified beer, being deficient in gas, I now proceed to aerate. This aeration is best effected at once, lest it absorb or develop further impurities. In fact I may aerate the beer within the housing of the separator, or a separate aerator of suitable construction can be located close to the purifier. To this end I preferably conduct the beer at once from the purifier or separator E into the aerator F. This is preferably done through the medium of a pipe $d$ with the aid of a pump I. This aerator may be any suitable aerating or carbonating apparatus, but I prefer my centrifugal aerator invented by me and forming the subject-matter of another application for Letters Patent, Serial No. 535,850, filed January 23, 1895, which spreads out or attenuates the beer in thin films in the presence of the gas. This aeration or carbonation is satisfactorily effected under a gas-pressure of from two or three atmospheres. I prefer to charge the beer to an inherent gaseous pressure higher than the ultimate inherent gaseous pressure of the bottled or bunged product. The gas is conducted to the aerator F by a pipe $g'$ from any suitable source, but preferably from the storage tank or reservoir C, where the gas which was taken from the wort is held under pressure, thus utilizing to some extent the gas generated by the fermentation and given off by the wort. After the beer has been aerated or carbonated to the required pressure it is conducted into a receiving-tank G by a pipe $e$, in which is placed a valve or cock $f$. The beer is held in this receiving-tank under pressure until it has become surcharged. An excess of the gas may be allowed to escape through the pipe $g$, which connects the receiving-tank G with the pipe $a$, when it is desired to save the gas. In this pipe $g$ is a suitable reducing-valve $h$ for maintaining the uniform pressure. This tank G is the final receiving or storing tank, and from this tank the beer may be directly bottled under pressure or drawn into a tank H. The top of tank G connects by pipe $a^2$ with top of tank H. Another pipe $t$, provided with a valve $y$, connects the top of tank H with the pipe $g'$ from tank C. Into the tank H the beer is admitted by the pipe $w$ at the pressure of tank G, the gas-pressure upon the beer before racking or bottling being by preference let down to atmospheric pressure through pipe $x$ by opening the valve in said pipe and allowing the gas to escape, so that when the beer is bottled from this tank H the bottling may be performed at atmospheric pressure. After bottling the escape of the excess of gas before mentioned from the beer into the unfilled portion of the package will maintain the beer under pressure and relieve the excess of pressure originally given and bring it to the required pressure.

What I claim, and desire to secure by Letters Patent, is—

1. The herein-described apparatus for the manufacture of beer, consisting of the fermenting-vat, a gas-receiver, a pump and connections between said gas-receiver and vat whereby the gas may be removed from the vat and stored under pressure in the receiver, a cooling-chamber, a pipe by which the beer may be conducted from the vat to the cooling-chamber, a separator or purifier connected with and receiving the beer from the cooling-chamber, an aerator connected with and receiving the beer from the purifier, a pipe connecting said aerator with the gas-receiver whereby to utilize the gas generated by the fermentation, a beer-receiving tank, a valve-controlled pipe connecting said beer-receiving tank with the aerator, a storage-tank connected with the beer-receiving tank, and a valve-controlled pipe connecting said storage-tank with the connection between the gas-receiver and the aerator, all substantially as and for the purpose set forth.

2. The herein-described apparatus for the manufacture of beer, consisting of the fermenting-vat, a gas-receiver, a pump and connections between said gas-receiver and vat whereby the gas may be removed from the vat and stored under pressure in the receiver, a pipe by which the beer may be conducted from the vat, a separator or purifier, an aerator connected with and receiving the beer from the purifier, a pipe connecting said aerator with the gas-receiver, whereby to utilize the gas generated by the fermentation, a beer-receiving tank, a pipe connecting said beer-receiving tank with the aerator, a storage-tank connected with the beer-receiving tank, and a valve-controlled pipe connecting said storage-tank with a gas-receiver, all substantially as and for the purpose set forth.

PETER COOPER HEWITT.

Witnesses:
C. SEDGWICK,
GEO. M. HOPKINS.